US011477752B1

(12) United States Patent
Harrebek et al.

(10) Patent No.: US 11,477,752 B1
(45) Date of Patent: Oct. 18, 2022

(54) USER EQUIPMENT RADIATED IN-BAND PHASE CENTER OFFSET VARIATION COMPENSATION USING A REFERENCE DEVICE

(71) Applicant: NOKIA TECHNOLOGIES OY, Espoo (FI)

(72) Inventors: Johannes Harrebek, Aalborg (DK); Oana-Elena Barbu, Aalborg (DK); Benny Vejlgaard, Gistrup (DK); Ryan Keating, Chicago, IL (US); Simon Svendsen, Aalborg (DK)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 17/304,171

(22) Filed: Jun. 15, 2021

(51) Int. Cl.
*H04W 24/00* (2009.01)
*H04W 64/00* (2009.01)
*H04W 8/24* (2009.01)

(52) U.S. Cl.
CPC ............ *H04W 64/00* (2013.01); *H04W 8/24* (2013.01)

(58) Field of Classification Search
None
See application file for complete search history.

(56) References Cited

U.S. PATENT DOCUMENTS

2015/0257121 A1\* 9/2015 Siomina .............. H04W 64/003
455/456.6

\* cited by examiner

*Primary Examiner* — Suhail Khan
(74) *Attorney, Agent, or Firm* — Brake Hughes Bellermann LLP

(57) ABSTRACT

Improved techniques of UE local and network assisted compensation of the UE PCO impact on positioning reference signal include performing compensation of positioning measurement error by transmitting a reference signal to a proximate reference device. In some implementations, the reference signal is a wideband reference signal, and the compensation is over a wide band of frequencies. In some implementations, the positioning measurement error includes a PCO in-band variation (IBV). In such an implementation, the UE may associate a respective compensation over the wide band of frequencies with an antenna panel and/or an angle with respect to the proximate reference device (RD).

24 Claims, 11 Drawing Sheets

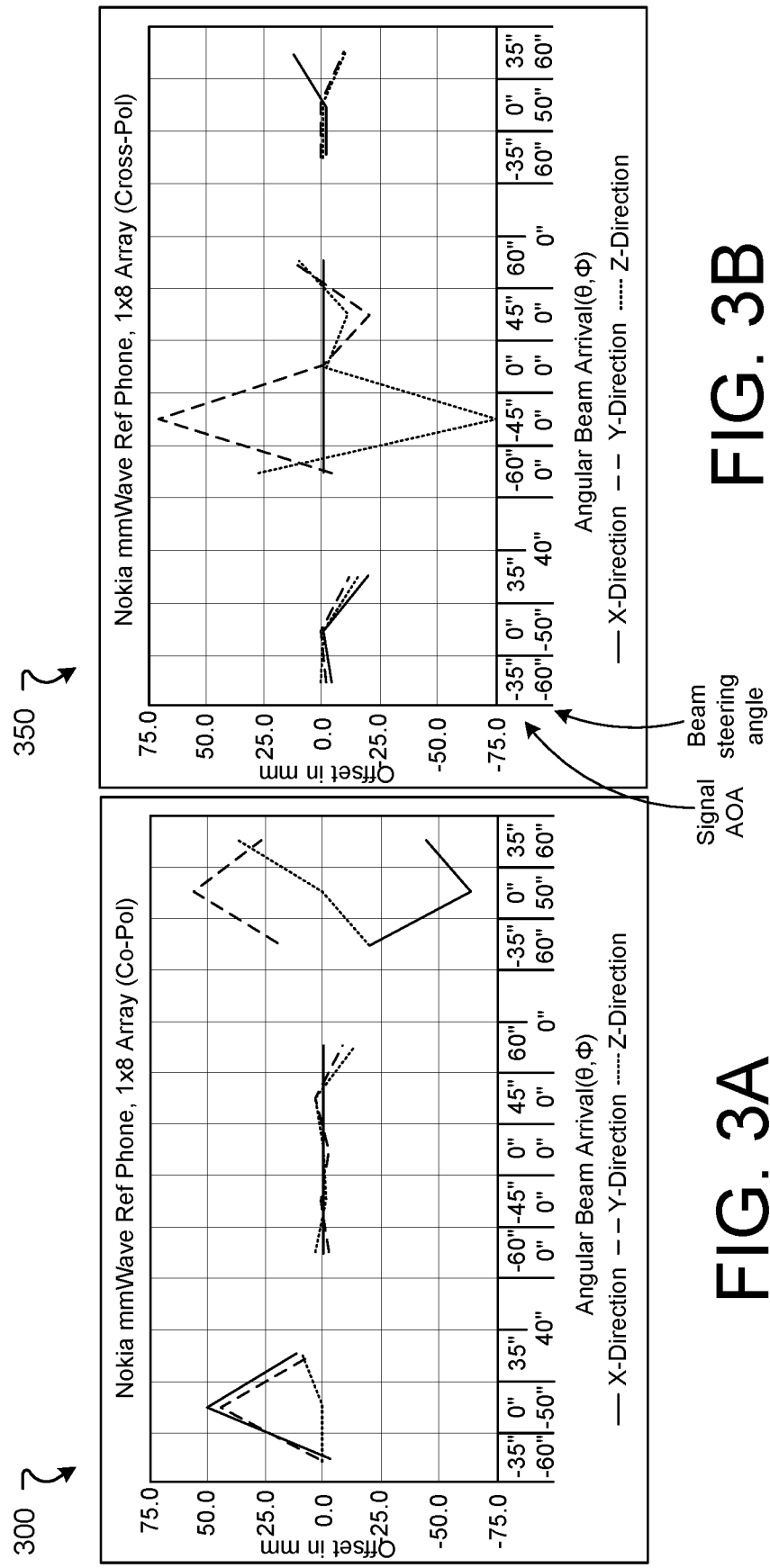

USER EQUIPMENT RADIATED IN-BAND PHASE CENTER OFFSET VARIATION COMPENSATION USING A REFERENCE DEVICE

TECHNICAL FIELD

This description relates to communications.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the 3$^{rd}$ Generation Partnership Project (3GPP). A recent development in this field is often referred to as the long-term evolution (LTE) of the Universal Mobile Telecommunications System (UMTS) radio-access technology. E-UTRA (evolved UMTS Terrestrial Radio Access) is the air interface of 3GPP's LTE upgrade path for mobile networks. In LTE, base stations or access points (APs), which are referred to as enhanced Node AP (eNBs), provide wireless access within a coverage area or cell. In LTE, mobile devices, or mobile stations are referred to as user equipment (UE). LTE has included a number of improvements or developments.

A global bandwidth shortage facing wireless carriers has motivated the consideration of the underutilized millimeter wave (mmWave) frequency spectrum for future broadband cellular communication networks, for example. mmWave (or extremely high frequency) may, for example, include the frequency range between 30 and 300 gigahertz (GHz). Radio waves in this band may, for example, have wavelengths from ten to one millimeters, giving it the name millimeter band or millimeter wave. The amount of wireless data will likely significantly increase in the coming years. Various techniques have been used in attempt to address this challenge including obtaining more spectrum, having smaller cell sizes, and using improved technologies enabling more bits/s/Hz. One element that may be used to obtain more spectrum is to move to higher frequencies, e.g., above 6 GHz. For fifth generation wireless systems (5G), an access architecture for deployment of cellular radio equipment employing mmWave radio spectrum has been proposed. Other example spectrums may also be used, such as cmWave radio spectrum (e.g., 3-30 GHz).

SUMMARY

According to an example implementation, a method includes transmitting, by a user equipment to a network node, capability data indicating a capability of compensating for a positioning measurement error. The method further includes receiving, from the network node, configuration data representing information for configuring reference signal resources for compensating the positioning measurement error. The method further includes transmitting, to a reference device proximate to the user equipment, a reference signal using the configured signal resources. The method further includes receiving, from the reference device after transmitting the reference signal, compensation data representing values of compensation parameters for compensating the positioning measurement error.

According to an example implementation, an apparatus includes at least one processor and at least one memory including computer program code, the at least one memory and the computer program code configured to, with the at least one processor, cause the apparatus at least to transmit, by a user equipment to a network node, capability data indicating a capability of compensating for a positioning measurement error. The at least one memory and the computer program code are further configured to, with the at least one processor, cause the apparatus at least to receive, from the network node, configuration data representing information for configuring reference signal resources for compensating the positioning measurement error. The at least one memory and the computer program code are further configured to, with the at least one processor, cause the apparatus at least to transmit, to a reference device proximate to the user equipment, a reference signal using the configured signal resources. The at least one memory and the computer program code are further configured to, with the at least one processor, cause the apparatus at least to receive, from the reference device after transmitting the reference signal, compensation data representing values of compensation parameters for compensating the positioning measurement error.

According to an example implementation, an apparatus includes means for transmitting, by a user equipment to a network node, capability data indicating a capability of compensating for a positioning measurement error. The apparatus also includes means for receiving, from the network node, configuration data representing information for configuring reference signal resources for compensating the positioning measurement error. The apparatus further includes means for transmitting, to a reference device proximate to the user equipment, a reference signal using the configured signal resources. The apparatus further includes means for receiving, from the reference device after transmitting the reference signal, compensation data representing values of compensation parameters for compensating the positioning measurement error.

According to an example implementation, a computer program product includes a computer-readable storage medium and storing executable code that, when executed by at least one data processing apparatus, is configured to cause the at least one data processing apparatus to transmit, by a user equipment to a network node, capability data indicating a capability of compensating for a positioning measurement error. The executable code, when executed by at least one data processing apparatus, is also configured to cause the at least one data processing apparatus to receive, from the network node, configuration data representing information for configuring reference signal resources for compensating the positioning measurement error. The executable code, when executed by at least one data processing apparatus, is also configured to cause the at least one data processing apparatus to transmit, to a reference device proximate to the user equipment, a reference signal. The executable code, when executed by at least one data processing apparatus, is also configured to cause the at least one data processing apparatus to receive, from the reference device after transmitting the reference signal, compensation data representing values of compensation parameters for compensating the positioning measurement error.

According to an example implementation, a method includes receiving, by a network node from a user equipment, first capability data indicating a capability of the user equipment to compensate for a positioning measurement error. The method further includes receiving, from a reference device proximate to the user equipment, second capability data indicating a capability of the reference device to compensate for the positioning measurement error. The method further includes transmitting, to the user equipment, configuration data representing information for configuring reference signal resources for compensating the positioning measurement error, the configuration data being based on the first capability data and the second capability data.

According to an example implementation, an apparatus includes at least one processor and at least one memory including computer program code, the at least one memory and the computer program code configured to, with the at least one processor, cause the apparatus at least to receive, by a network node from a user equipment, first capability data indicating a capability of the user equipment to compensate for a positioning measurement error. The at least one memory and the computer program code are further configured to receive, from a reference device proximate to the user equipment, second capability data indicating a capability of the reference device to compensate for the positioning measurement error. The at least one memory and the computer program code are further configured to transmit, to the user equipment, configuration data representing information for configuring reference signal resources for compensating the positioning measurement error, the configuration data being based on the first capability data and the second capability data.

According to an example implementation, an apparatus includes means for receiving, by a network node from a user equipment, first capability data indicating a capability of the user equipment to compensate for a positioning measurement error. The apparatus also includes means for receiving, from a reference device proximate to the user equipment, second capability data indicating a capability of the reference device to compensate for the positioning measurement error. The apparatus further includes means for transmitting, to the user equipment, configuration data representing information for configuring reference signal resources for compensating the positioning measurement error, the configuration data being based on the first capability data and the second capability data.

According to an example implementation, a computer program product includes a computer-readable storage medium and storing executable code that, when executed by at least one data processing apparatus, is configured to cause the at least one data processing apparatus to receive, by a network node from a user equipment, first capability data indicating a capability of the user equipment to compensate for a positioning measurement error. The executable code, when executed by at least one data processing apparatus, is also configured to cause the at least one data processing apparatus to receive, from a reference device proximate to the user equipment, second capability data indicating a capability of the reference device to compensate for the positioning measurement error. The executable code, when executed by at least one data processing apparatus, is also configured to cause the at least one data processing apparatus to transmit, to the user equipment, configuration data representing information for configuring reference signal resources for compensating the positioning measurement error, the configuration data being based on the first capability data and the second capability data.

The details of one or more examples of implementations are set forth in the accompanying drawings and the description below. Other features will be apparent from the description and drawings, and from the claims.

BRIEF DESCRIPTION OF THE DRAWINGS

FIGS. 3A-3B are diagrams illustrating plots of phase center offset as a function of signal angle of arrival (AoA) and beam steering angle for co-polarized and cross-polarized beams, respectively, according to an example implementation.

DETAILED DESCRIPTION

Figure 1:
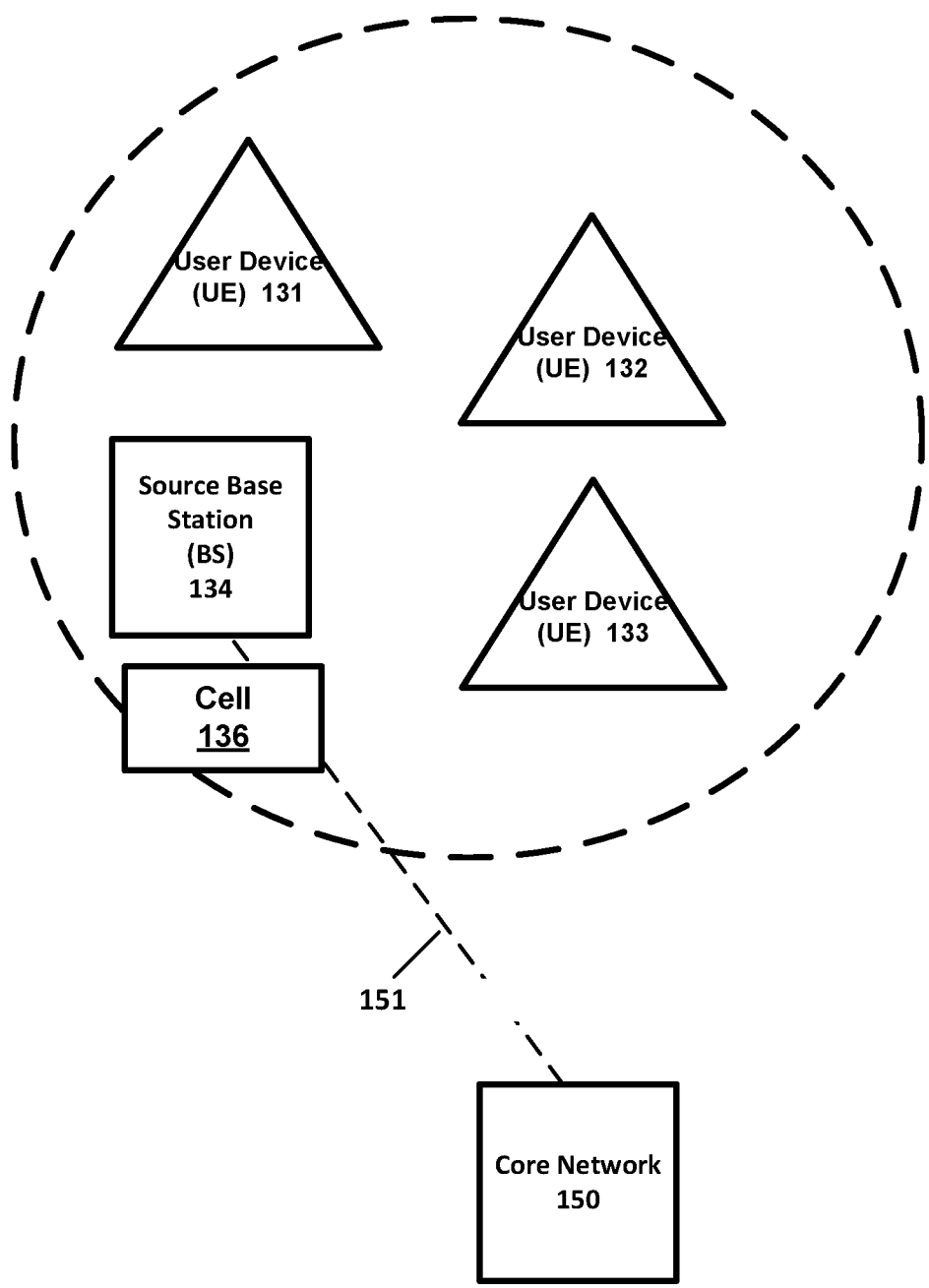
FIG. 1 is a block diagram of a digital communications network according to an example implementation.

FIG. 1 is a block diagram of a digital communications system such as a wireless network 130 according to an example implementation. In the wireless network 130 of FIG. 1, user devices 131, 132, and 133, which may also be referred to as mobile stations (MSs) or user equipment (UEs), may be connected (and in communication) with a base station (BS) 134, which may also be referred to as an access point (AP), an enhanced Node B (eNB), a gNB (which may be a 5G base station) or a network node. At least part of the functionalities of an access point (AP), base station (BS) or (e)Node B (eNB) may be also be carried out by any node, server or host which may be operably coupled to a transceiver, such as a remote radio head. BS (or AP) 134 provides wireless coverage within a cell 136, including the user devices 131, 132 and 133. Although only three user devices are shown as being connected or attached to BS 134, any number of user devices may be provided. BS 134 is also connected to a core network 150 via an interface 151. This is merely one simple example of a wireless network, and others may be used.

A user device (user terminal, user equipment (UE)) may refer to a portable computing device that includes wireless mobile communication devices operating with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, and a multimedia device, as examples. It should be appreciated that a user device may also be a nearly exclusive uplink only device, of which an example is a camera or video camera loading images or video clips to a network.

In LTE (as an example), core network 150 may be referred to as Evolved Packet Core (EPC), which may include a mobility management entity (MME) which may handle or assist with mobility/serving cell change of user devices between BSs, one or more gateways that may forward data and control signals between the BSs and packet data networks or the Internet, and other control functions or blocks.

The various example implementations may be applied to a wide variety of wireless technologies, wireless networks, such as LTE, LTE-A, 5G (New Radio, or NR), cmWave, and/or mmWave band networks, or any other wireless network or use case. LTE, 5G, cmWave and mmWave band networks are provided only as illustrative examples, and the various example implementations may be applied to any wireless technology/wireless network. The various example implementations may also be applied to a variety of different applications, services or use cases, such as, for example, ultra-reliability low latency communications (URLLC), Internet of Things (IoT), time-sensitive communications (TSC), enhanced mobile broadband (eMBB), massive machine type communications (MMTC), vehicle-to-vehicle (V2V), vehicle-to-device, etc. Each of these use cases, or types of UEs, may have its own set of requirements.

Various nodes, applications, and/or gNBs, may ask the gNB or a LMF (location management function located in core network) to obtain a location of a UE. Location of a UE can be performed using various techniques, that usually rely on a measurement (e.g., phase measurement) of received positioning reference signals from at least 3 transmitters (PRS signal sources). For example, a self-driving service, may need to constantly (e.g., every 100 ms) know an exact location of each of its self-driving cars as part of its taxicab service. Or an employer may wish to track employee badges, shipment containers, or other important objects, etc. Thus, tracking of objects is important, e.g., determining location of a UE. Many applications or nodes may need to know a location of a UE.

Positioning reference signals are generally any reference signals (which can be DL reference signals transmitted by gNB, or UL reference signals transmitted by UE), that can be used for positioning a UE. For example, gNBs may transmit DL PRS signals, and the UE may perform measurements on each of these received PRS signals (e.g., UE may perform correlation to detect a peak, to detect presence of the received signal, and then detect a delay of the received PRS signal), and then may report that measured phase to a gNB. This may be done for multiple PRS signals received by UE from different gNBs (from different PRS signal transmitters). UE may report these signal measurements to LMF (a positioning control entity in core network, known as location management function), where the LMF may then report the UE location to some application or gNB that may have requested location of that UE. Or UE may report these signal measurements to its serving gNB, which may determine UE location. Alternatively, if UE knows location of various gNB/PRS transmitters, the UE may determine its own location based on these PRS signal measurements of at least 3 DL PRS signals received from gNBs or nodes, and then UE may then report its location to gNB or LMF.

It is noted that while the DL PRS is, in some implementations, a specific reference signal defined in 3GPP, the improved techniques described herein applies more broadly to any reference signal used for positioning. The same applies to sounding reference signals.

In the UL direction, the UE may transmit UL PRS signals, e.g., Sounding reference signals, which may be received by multiple gNBs, e.g., such as serving gNB and other non-serving gNBs. Each of these gNBs may perform signal (e.g., delay) measurements on received SRS signals (similar to above), and these gNBs may report these signal measurement to the LMF or to a gNB, which may then estimate UEs location based on these multiple signal measurements (e.g., signal measurements measured at 3 or more locations.

For Rel_17 3GPP, general position accuracy in the sub-meter range is the target and specific for IIoT cases the requirement is further tightened targeting centimeter accuracy.

Downlink Time Difference of Arrival (DL-TDOA) is one of the Rel-16 methods specified and this can be either UE assisted, or UE based. For UE assisted positioning the UE is measuring PRS TOA and reporting RSTD (Reference Signal Time Difference) to the network/LMF for UE position calculation. For the UE based positioning the UE is receiving information about the position of all involved gNBs in the positioning assistance data and the UE may estimate its own position based on this info and the PRS TOA measurements.

Multi-RTT is another Rel-16 method and relies on both UL and DL measurements/signals. At a high level the method works by multiple gNBs transmitting the DL PRS to the UE and then the UE transmits the SRS-P to the gNBs. The UE measures the UE Rx-Tx time difference for each cell while each gNB measure the gNB Rx-Tx time difference for the UE. All the measurements are reported to the location management function (LMF) which can then estimate the RTT to each gNB from the UE and therefore can estimate the position of the UE.

A Reference Device (RD) may be used to assist with network impairments calibrations. An RD may be a gNB, a remote TRP or a UE with a known physical position and with the position known for both RD and gNB this can be used for calibrating absolute network impairment parameters e.g., related to accurate positioning. A RD may also be called a positioning reference unit (PRU).

The RD may be designed specifically for the purpose. Specifically, any RD ref-clock offsets/drift, RX/TX group Delay (GD) and antenna Phase Center Offset (PCO) variation over antenna beam steering angle and signal Angle of Arrival/Angle of Departure (AOA/AOD) may be zero per design or fully compensated for the RD to represent its position accurately towards the network.

In some implementations, more than one RD is deployed and accessible for a gNB to enable calibration of beam steering dependent impairments. In some implementations, RDs are devices without user interaction to avoid proximity mismatch conditions.

At the UE a precise assessment of DL PRS time of arrival (TOA) and/or the UL SRS time of departure (TOD) is used for obtaining accurate positioning measurements. A precise measure of the phase reference position for the signal being received or transmitted via the UE antenna may be used in obtaining highly accurate TOA/TOD measurements.

Figure 2:
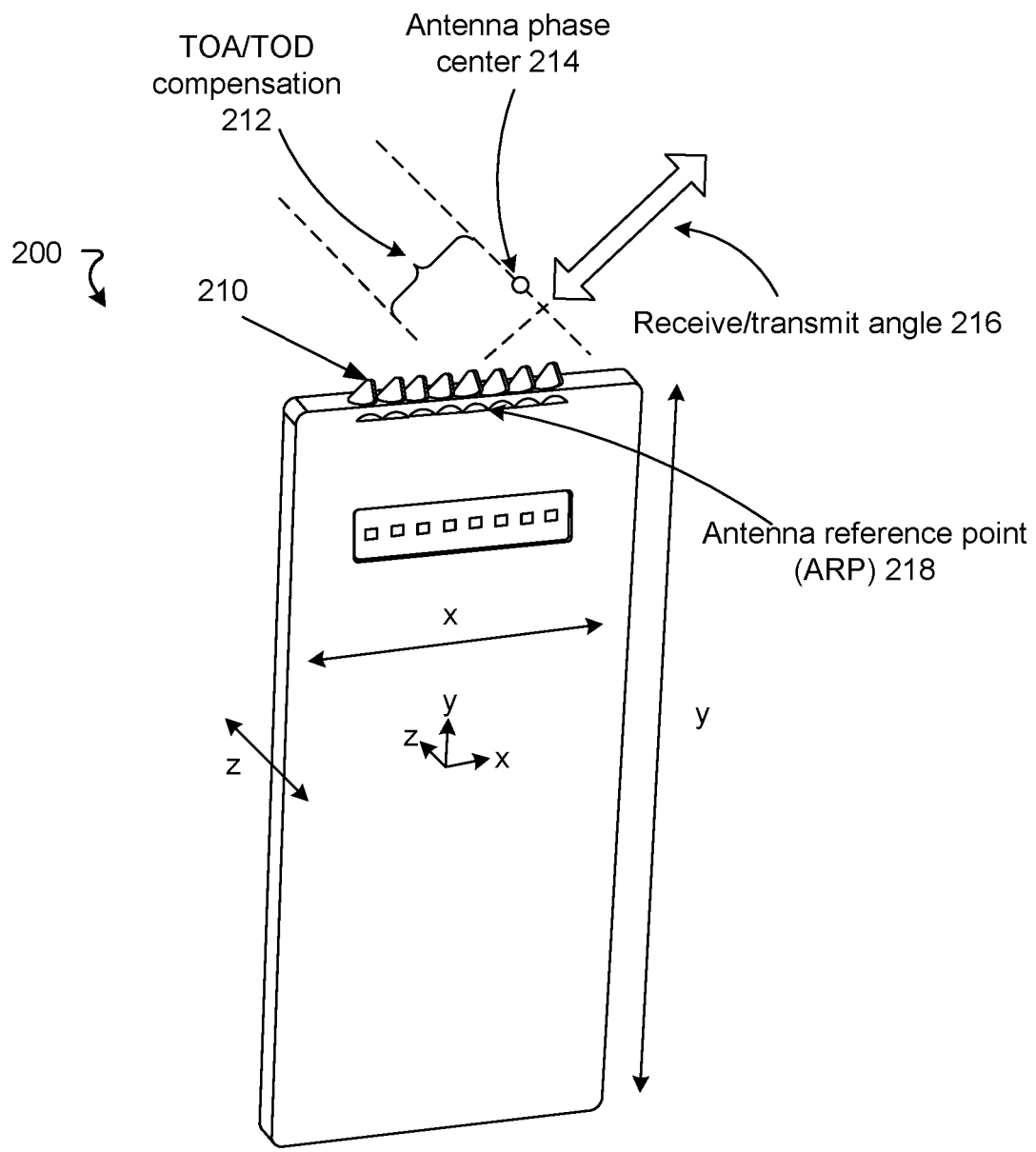
FIG. 2 is a diagram illustrating a mmWave antenna array mounted on a user equipment, according to an example implementation.

Such a reference position is the antenna phase center which ideally is fixed and aligns with a physical Antenna Reference Point (ARP). The antenna phase center however, may not always align with the physical ARP but may be located at an offset. Such an offset is illustrated in FIG. 2, which shows an example mmWave 1:8 antenna array of a UE, mounted on a UE form-factor design.

The UE antenna array phase center location is dynamic and is sensitive to:
  the actual UE formfactor design (with current flow influenced by physical dimensions, mounted proximity components, materials, etc.),
  the antenna array cover e.g., PC-ABS, glass,
  the AOA and polarization for broad beam configuration,
  the antenna array beam steering angle,
  AOA on the one-dimensional spatial filtered beam pattern for 1 dimensional antenna arrays,
  the polarization at used beam steering angle.

FIGS. 3A and 3B illustrate a phase center offset (PCO) with respect to ARP for a UE formfactor with a top-mounted 1:8 array over beam-steering angle, angular beam arrival (AOA), and polarization. FIG. 3A corresponds to co-polarized beams and FIG. 3B corresponds to cross-polarized beams.

As observed the antenna array phase center may vary dynamically by several centimeters and if left uncompensated it is therefore a key impairment significantly reducing the position estimation accuracy for centimeter accuracy applications like IIoT.

Conventional approaches to UE local and network assisted compensation of the UE PCO impact on positioning reference signal TOA/TOD based on UE characterization exist and are being discussed in 3GPP. These approaches, however, do not take into account any in-band variation on the antenna PCO for wide bandwidth reference signals.

For cm level position accuracy very high bandwidth positioning signals are required and conventional UE antenna PCO characterization and compensation solutions do not take into account any frequency variation within the positioning signal bandwidth.

Figure 4A:
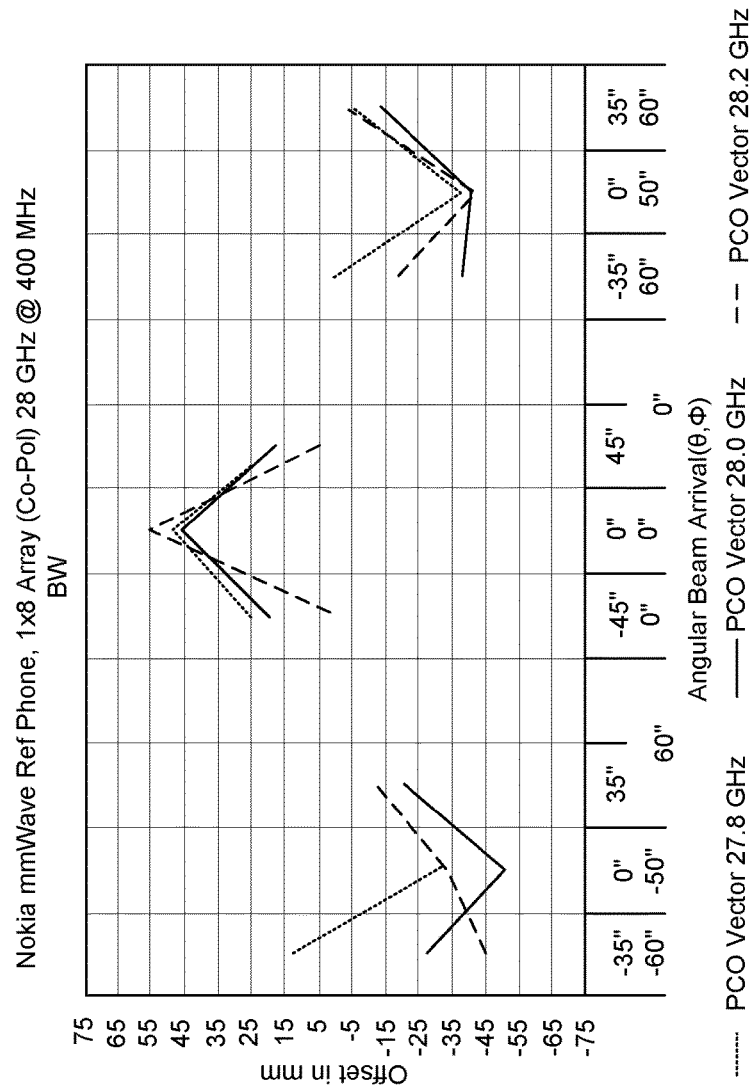
FIGS. 4A-4B are diagrams illustrating plots of phase center offset as a function of signal angle of arrival (AoA) and beam steering angle for co-polarized beams, for 28 GHz+/−200 MHz and 28 GHz+/−1000 MHz, respectively, according to an example implementation.
Figure 4B:
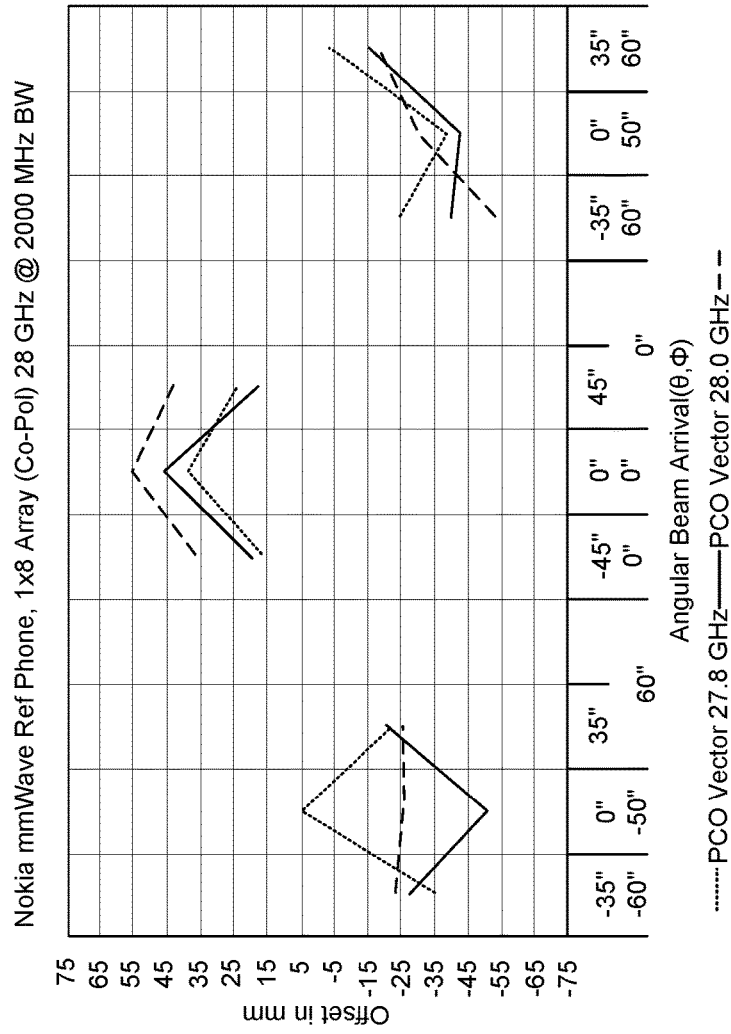

To analyze the magnitude of UE antenna PCO in-band variations CST 3D EM simulations have been conducted on the UE formfactor design depicted in FIG. 2. Results are shown in FIGS. 4A and 4B for f=fc=28 GHz and for f=fc±200 MHz and f=fc±1000 MHz for different beam steering angles and different signal directions. FIGS. 4A and 4B illustrate PCO with respect to ARP for a UE formfactor with a top-mounted 1:8 array over beam-steering angle and AOA, for co-polarized beams, for a 28 GHz center frequency, 28 GHz+/−200 MHz, and 28 GHz+/−1000 MHz. FIG. 4A corresponds to a 400 MHz bandwidth (BW) and FIG. 4B corresponds to a 2000 MHz BW.

The boresight configuration is the most symmetric configuration which result in the smallest PCO variations. Nevertheless, even in this case sizable PCO variation over frequency is observed (several centimeters) which will impact the positioning accuracy if left uncompensated.

Based on this, for high bandwidth positioning reference signals, compensating the PCO by a characterized adjustment of the reference signal TOA/TOD may not be adequate since this in-band PCO variation, which is equivalent to radiated in-band GD distortion of the signal, will impact the otherwise obtainable accuracy from using wide band positioning signals.

A full characterization over antennas, steering angles, AOA/AOD and fine resolution frequency is a massive over-the-air (OTA) UE characterization effort in phone production and is therefore both time and cost wise unattractive. Solutions for compensating this UE antenna PCO frequency variation impairment while maintaining reasonable UE characterization burden are needed.

In contrast to the above-described conventional approaches to UE local and network assisted compensation of the UE PCO impact on positioning reference signal TOA/TOD based on UE characterization, improved techniques of UE local and network assisted compensation of the UE PCO impact on positioning reference signal include performing compensation of positioning measurement error by transmitting a reference signal to a proximate reference device. In some implementations, the reference signal is a wideband reference signal, and the compensation is over a wide band of frequencies. In some implementations, the positioning measurement error includes a PCO in-band variation (IBV). In such an implementation, the UE may associate a respective compensation over the wide band of frequencies with an antenna panel and/or an angle with respect to the proximate reference device (RD).

Advantageously, the above-described improved technique produces more accurate positioning reference signal TOA/TOD measurements. This in turn may improve positioning accuracy at the UE.

The basic idea is to perform relative UE PCO in-band variation (PCO IBV) compensation in-the-field over-the-air by using available RDs in proximity of the UE for the compensation measurements.

Figure 5:
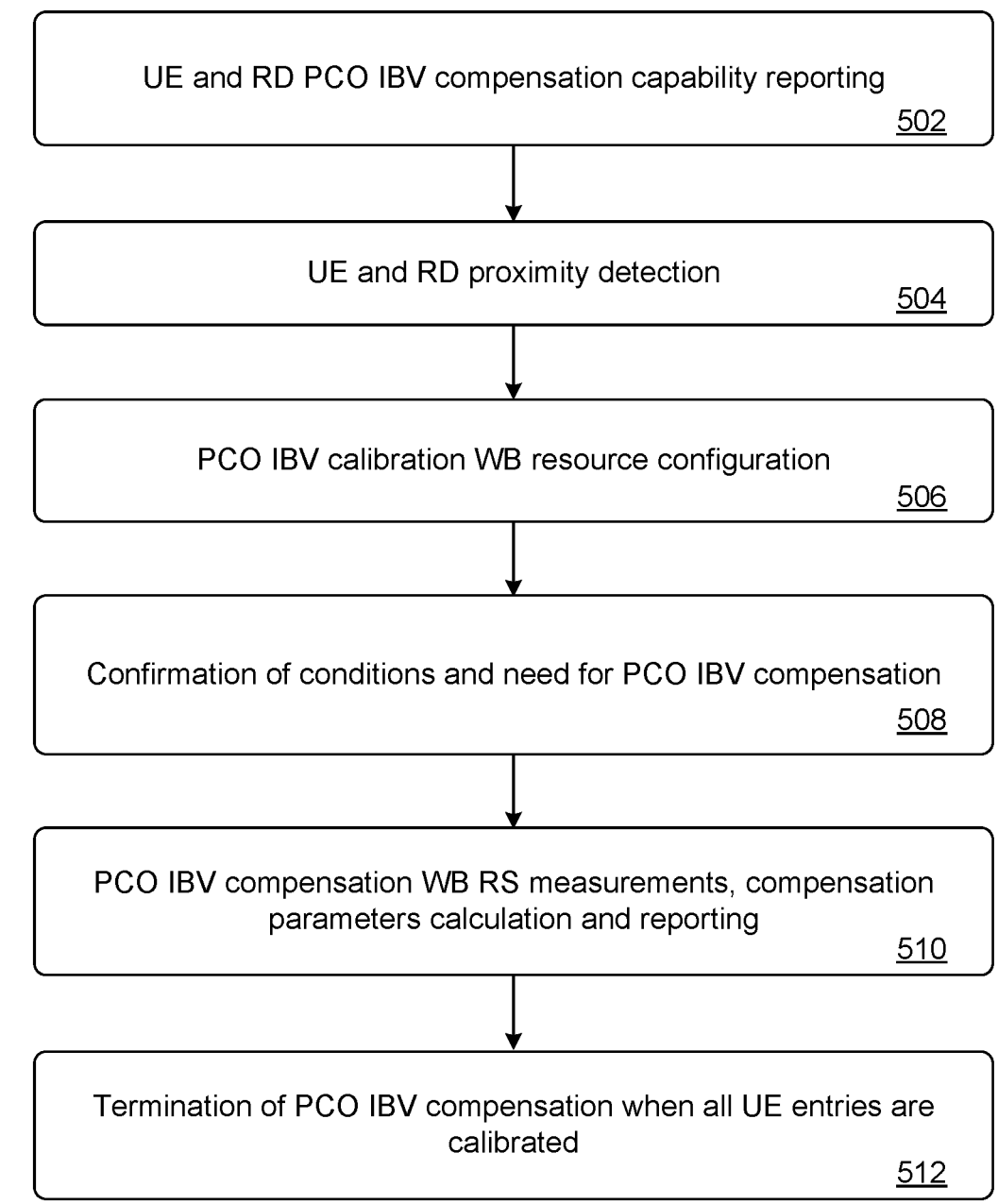
FIG. 5 is a flow chart illustrating compensation of phase center offset in-band variation using a proximate reference device according to an example implementation.

FIG. 5 is a flow chart illustrating a process 500 of compensating phase center offset in-band variation using a proximate reference device.

At 502, both a UE and a RD report their PCO IBV compensation capability to a network node (gNB).

At 504, the gNB detects a proximity between the UE and RD. That is, the gNB determines that the RD is proximate to the UE. In some implementations, the proximity detection may be based e.g., on resent localization events or based on UE and RD using same serving gNB beam index. Alternative, the UE and RD may perform the discovery locally using a side-link connection.

At 506, the gNB configures wideband (WB) reference signal (RS) resources for the UE PCO IBV compensation. The WB RS configuration refers to, in some implementations, selecting one or more carrier frequencies and associated bandwidths, a subframe index, a periodicity, a modulation or any other signal signature.

At 508, the UE confirms that an antenna panel of an antenna array and an angle toward the RD (i.e., angle between the UE and RD) represent an uncompensated PCO IBV entry and that conditions are acceptable for initiating the PCO IBV compensation. In some implementations, the conditions may be determined via metrics including, but not limited to, LOS indication/probability, SNR, RSRP.

At 510, the UE transmits, and the RD measures the WB RS. In some implementations, the RD calculates the PCO IBV by comparing to known ideal WB RS and reports compensation parameters to the UE. In some implementations, the UE stores the parameters in the appropriate PCO compensation entry for the used antenna panel of the antenna array and angle.

At 512, all of the antenna panels of the antenna array represent a compensated PCO IBV entry, and the UE signals terminations of future calibrations. In some implementations, the UE sends such a signal to the gNB.

The above-described process 500 has the following prerequisites:
  The RD has negligible receiver timing errors including PCO IBV. This is expected to be the case for an RD since it represents a perfect location reference for the network. The RD is also expected to be calibrating other parameters with the gNB/TRPs so it should be fully compensated for PCO IBV.

Any UE conducted transmitter GD variation compensation is active during the PCO IBV compensation procedure.

The PCO IBV procedure compensates the relative variation within the bandwidth of the transmitted RS. As such the UE is by prior art average PCO compensated within the BW of the transmitted RS and the UE compensation framework is prepared for in-band compensation.

Moreover, there are other considerations:

The process 500 involves WB signal transmission to a proximate device and as such the UE may run at low UE transmit power, reducing the overall cell interference and UE power consumption.

In some implementations, the UE has the same antenna configuration in DL and UL; accordingly, the updates can be used for both RX and TX compensation entries.

In some implementations, the WB resources are existing positioning resources and messages may use LPP or other protocol. In some implementations, the positioning resources are new.

Figure 6:
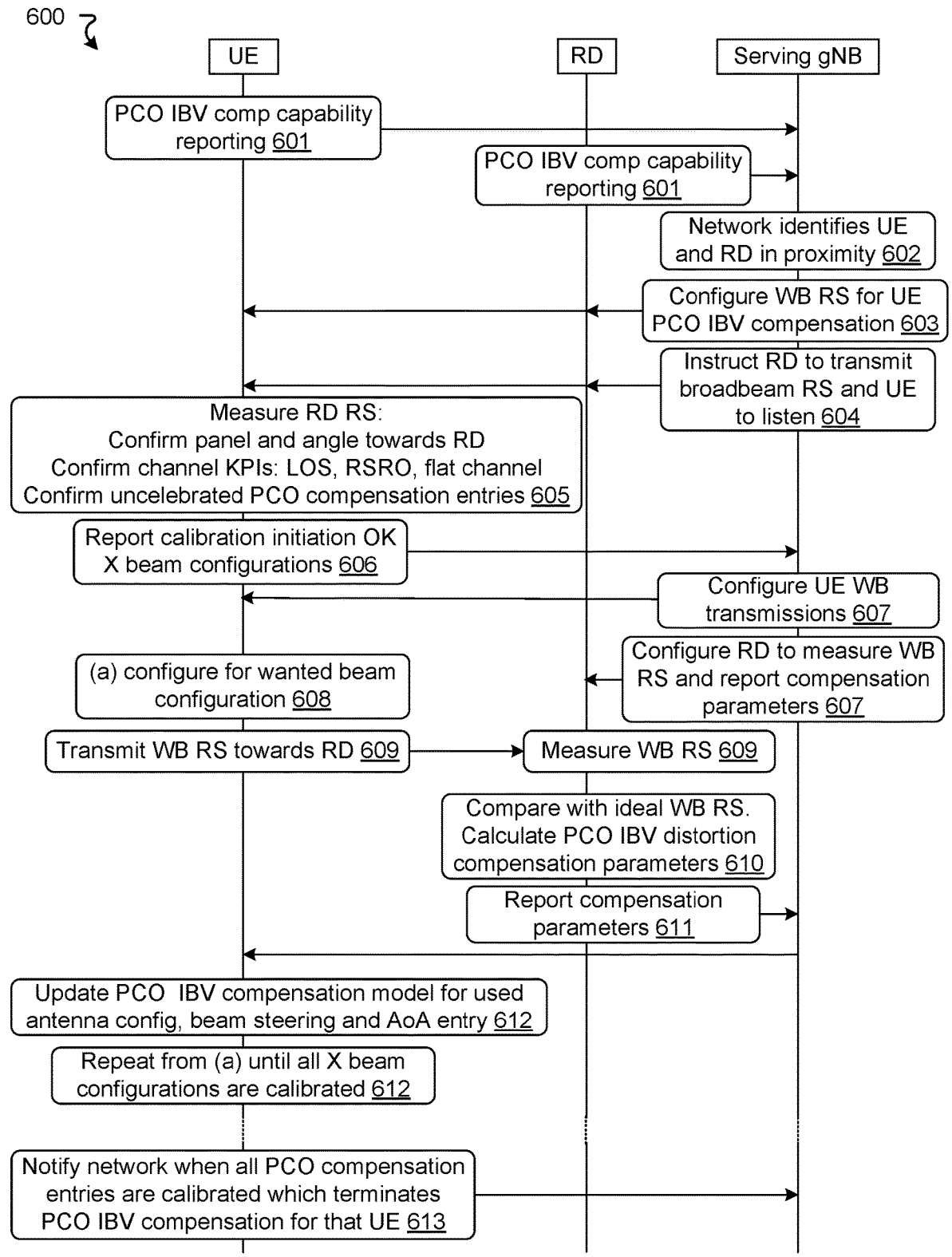
FIG. 6 is a sequence diagram illustrating compensation of phase center offset in-band variation using a proximate reference device, via a serving network node, according to an example implementation.

FIG. 6 is a sequence diagram illustrating a process 600 of compensating phase center offset in-band variation using a proximate reference device, via a serving network node.

At 601, the UE and RD report their respective PCO IBV compensation capability to the gNB. In some implementations, the reporting may be—but not limited to—a binary indicator linked to other capability reporting (e.g., supported bandwidth). In some implementations, the reporting includes information regarding a supported maximum bandwidth specific for PCO IBV compensation.

At 602, the gNB determines that the UE is in proximity of an RD; this determination is, in some implementations, a first trigger for initiation of the UE PCO IBV compensation procedure. In some implementations, the proximity determination is based on recent localization events. In some implementations, the proximity determination assumes the UE and the RD using same serving gNB beam index.

At 603, the gNB configures WB RS resources for the UE PCO IBV compensation.

At 604, the gNB instructs the RD to transmit broad beam RS and instructs the UE to listen for the broad beam RS. In some implementations, the broad beam RS is an available sounding reference signal for positioning (SRS-P).

At 605, the UE measures the RS and confirms that (i) an antenna panel of an antenna array and angle towards the RD represents an uncompensated PCO IBV entry and (ii) that channel conditions are acceptable for initiating a PCO IBV compensation. In some implementations, the conditions may be determined via metrics including, but not limited to, LOS indication/probability, SNR, RSRP. Any of these metrics or a combination of thereof may be tested against selected thresholds, e.g., UE-implementation specific or set by the network.

At 606, the UE reports to the gNB (i) that the PCO IBV compensation conditions determined at 605 are acceptable and (ii) a number of beam configurations (X) the UE is to compensate.

At 607, the gNB transmits (i) a request to the UE to transmit the WB RS and (ii) a request to the RD to measure WB RS and report PCO IBV compensation parameters.

At 608, the UE configures itself for the number of beam configurations (X).

At 609, the UE transmits the WB RS to the RD, and the RD measures the WB RS.

At 610, the RD calculates the PCO IBV compensation parameters by comparing to known ideal WB RS. In some implementations, the RD measures in-band group delay variation which is representative of the relative UE PCO IBV. The reporting format may be data over frequency, parameters in a defined model, or another format.

At 611, the RD reports the PCO IBV compensation parameters via the gNB to UE. In some implementations, the RD sends the report to the UE via a location management function (LMF).

At 612, the UE stores the PCO IBV compensation parameters in the appropriate PCO compensation entry for the considered antenna panel and angle; the process 600 returns to 608. The process 600 repeats until all X beam configurations are compensated.

At 613, the UE informs gNB that PCO IBV compensation for all PCO entries is complete. Over time the UE has compensated all relevant PCO entries and by then UE signals termination of future calibrations.

Figure 7:
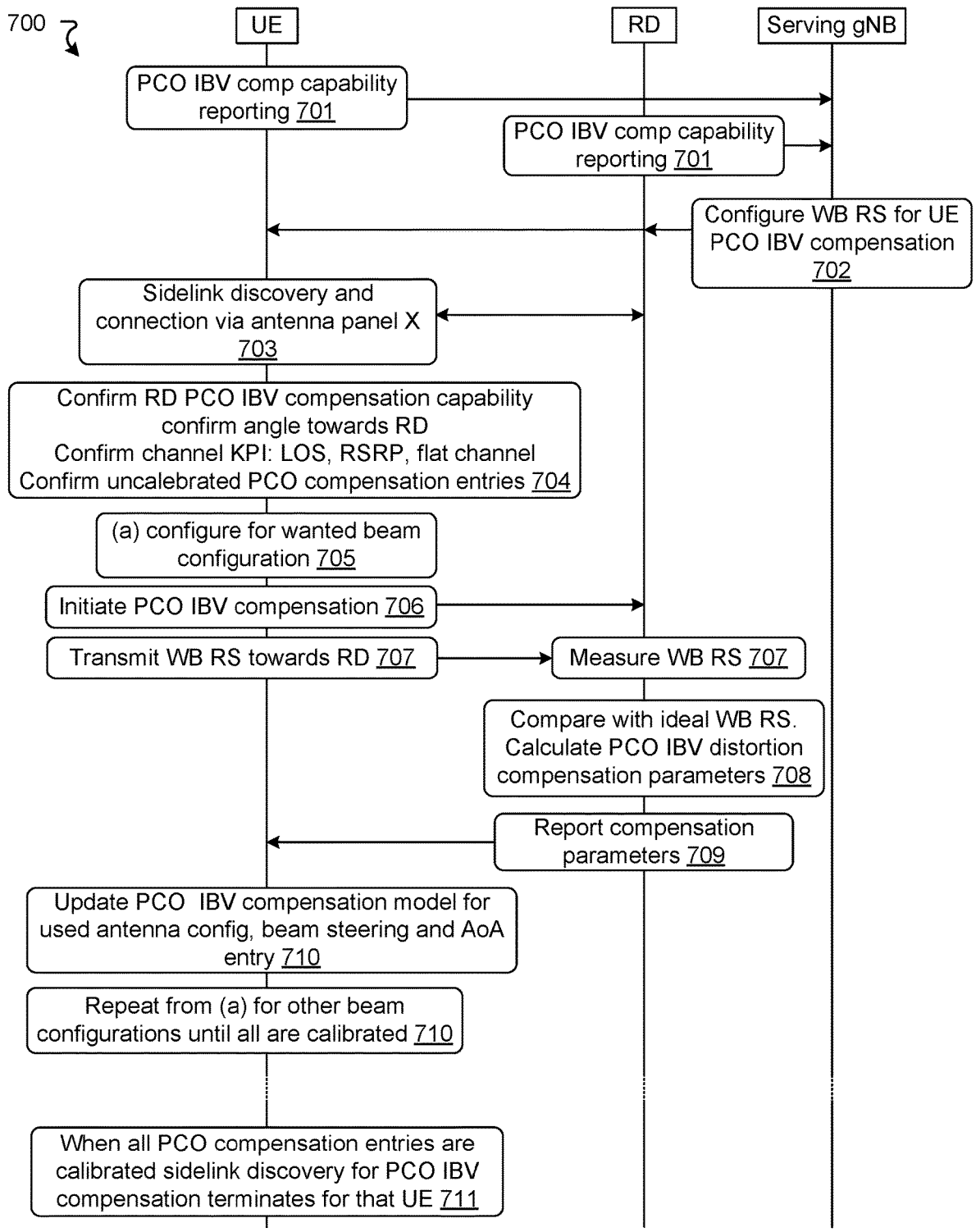
FIG. 7 is a sequence diagram illustrating compensation of phase center offset in-band variation using a proximate reference device, via a side-link connection, according to an example implementation.

FIG. 7 is a sequence diagram illustrating a process 700 of compensating phase center offset in-band variation using a proximate reference device, via a side-link connection.

At 701, the UE and RD report their respective PCO IBV compensation capability to the gNB. In some implementations, the reporting may be—but not limited to—a binary indicator linked to other capability reporting (e.g., supported bandwidth). In some implementations, the reporting includes information regarding a supported maximum bandwidth specific for PCO IBV compensation.

At 702, the gNB configures WB RS resources for the UE PCO IBV compensation.

At 703, the UE, via side-link discovery, determines that the RD is proximate to the UE and establishes a connection to the RD.

At 704, on the side-link connection, the UE confirms that the RD is PCO IBV compensation capable and that the antenna panel and angle towards the RD represents an uncompensated PCO IBV entry. The UE also confirms that channel conditions are acceptable for initiating a PCO IBV compensation. In some implementations, the conditions may be determined via metrics including, but not limited to, LOS indication/probability, SNR, RSRP.

At 705, the UE configures itself for the number of beam configurations (X).

At 706, the UE initiates PCO IBV compensation on the side-link connection towards the RD.

At 707, the UE transmits the WB RS to the RD, and the RD measures the WB RS.

At 708, the RD calculates the PCO IBV compensation parameters by comparing to known ideal WB RS. In some implementations, the RD measures in-band group delay variation which is representative of the relative UE PCO IBV. The reporting format may be data over frequency, parameters in a defined model, or another format.

At 709, the RD reports the PCO IBV compensation parameters to UE via side-link.

At 710, the UE stores the PCO IBV compensation parameters in the appropriate PCO compensation entry for the considered antenna panel and angle; the process 700 returns to 705. The process 700 repeats until all X beam configurations are compensated.

At 711, the UE stops initiating PCO IBV compensation requests when all PCO entries are compensated. Over time the UE has compensated all relevant PCO entries and by then UE signals termination of future calibrations. In some implementations, the UE also confirms a full compensation of the positioning measurement error as well. In some implementations, the UE avoids initiating future calibrations.

In some implementations, the enablement of the PCO in-band variation compensation can be configured dynamically. For example, the PCO IBV compensation, in some implementations, is done according to a schedule; for example:

A single time (fresh booting of the device),
Periodic (triggered purely on a timer), or
Dynamically based on the UE operation.

A UE may use only a part of all available antenna panels and/or angles for a very long time and in such a situation, it may be waste of time and/or power to keep polling. In some implementations, a dynamic continuous learning is used to have updated and valid compensation, only for the UE configurations needed. The PCO IBV compensation may be triggered by any of the following:

The beam angle and antenna configurations,
Duration since last update for each angle/configuration, or
Use patterns.

The PCO IBV may be updated for the used configurations and updated whenever needed. Such an updating may help improve performance while taking into considerations the antenna configuration, while preserving low power consumption, and while keeping signalling and resource overhead low.

In some implementations, the PCO IBV compensation uses a running average or other weighted average or any other memory-based metric for the continuously updates. Such a running average may ensure that updates are done while preserving the earlier learnings, i.e., using both current and past measurements to compute the update.

In some implementations, the PCO IBV compensation can be triggered by the LMF due to quality of measurements or timer expiration. In some implementations, the PCO IBV update is triggered by the UE directly (e.g., due to temperature change). An LMF, in some implementations, is implemented in a radio access network (RAN). An LMF may also be referred to a location management component (LMC).

Figure 8:
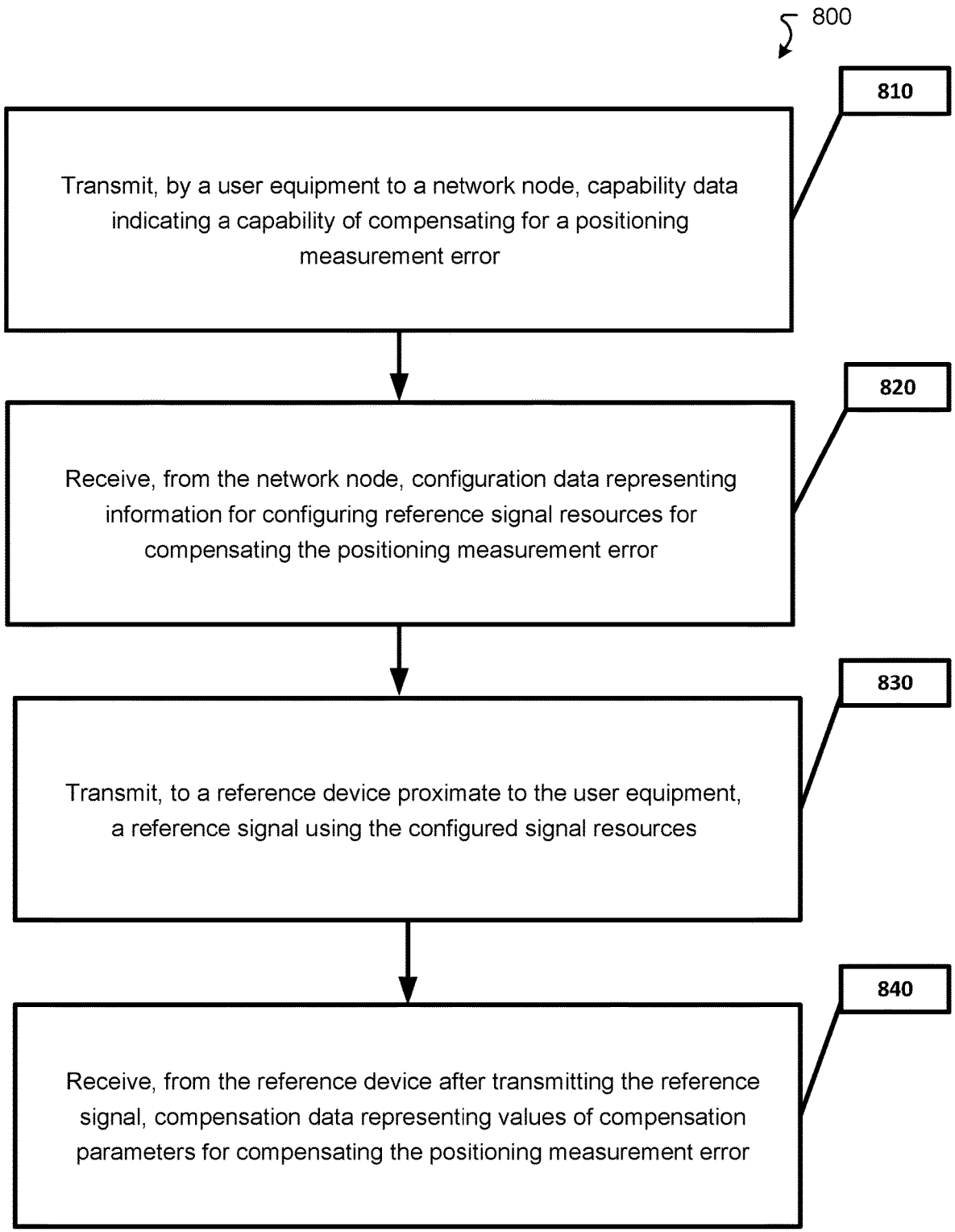
FIG. 8 is a flow chart illustrating compensation of positioning measurement error via a proximate reference device according to an example implementation.

Example 1-1: FIG. 8 is a flow chart illustrating a method of performing positioning measurement compensation according to an example implementation. At 810, the method includes transmitting, by a user equipment to a network node, capability data indicating a capability of compensating for a positioning measurement error. At 820, the method includes receiving, from the network node, configuration data representing information for configuring reference signal resources for compensating the positioning measurement error. At 830, the method includes transmitting, to a reference device proximate to the user equipment, a reference signal using the configured signal resources. At 840, the method includes receiving, from the reference device after transmitting the reference signal, compensation data representing values of compensation parameters for compensating the positioning measurement error.

Example 1-2: According to an example implementation of Example 1-1, wherein the capability data indicates a capability of compensating for the positioning measurement error over a wide band of frequencies, wherein the reference signal is a wideband reference signal, and wherein the reference signal resources are resources for a wideband reference signal, the wideband reference signal resources being configured for compensating the positioning measurement error over the wide band of frequencies.

Example 1-3: According to an example implementation of any of Examples 1-1 or 1-2, wherein the positioning measurement error over the wide band of frequencies includes a phase center offset in-band variation.

Example 1-4: According to an example implementation of Example 1-3, wherein the compensation data is received by the user equipment via the network node.

Example 1-5: According to an example implementation of Example 1-4, wherein the method further comprises receiving, from the reference device, a broad beam reference signal; performing a measurement of the broad beam reference signal to produce a measurement result; and transmitting reporting data to the network node, the reporting data being based on the measurement result, the reporting data representing at least one of (i) an indication that conditions for a compensation of the positioning measurement error are acceptable and (ii) a number of beam configurations for which a respective positioning measurement error is to be compensated.

Example 1-6: According to an example implementation of Example 1-5, wherein the method further comprises determining that (i) an antenna configuration of the user equipment and (ii) a relative location between the user equipment and the reference device corresponds to an uncompensated phase center offset in-band variation error; and determining that a reference signal quality metric from the broadband reference signal is greater than a threshold.

Example 1-7: According to an example implementation of any of Examples 1-5 or 1-6, wherein the method further comprises, after receiving the compensation data, storing an indication that a relative location between the user equipment and the reference device corresponds to a compensated phase center offset in-band variation error.

Example 1-8: According to an example implementation of any of Examples 1-5 to 1-7, wherein the method further comprises, after receiving the compensation data, transmitting termination data to the network node, the termination data indicating that the phase center offset in-band variation has been compensated.

Example 1-9: According to an example implementation of any of Examples 1-3 to 1-8, wherein the user equipment and the reference device are connected via a side-link connection, and wherein the method further comprises, prior to transmitting the wideband reference signal to the reference device, transmitting, to the reference device, initiation data representing an indication that a phase center offset in-band variation compensation operation is being initiated.

Example 1-10: According to an example implementation of Example 1-9, wherein the compensation data is received via the side-link connection.

Example 1-11: According to an example implementation of any of Examples 1-9 or 1-10, wherein the method further comprises, after receiving the compensation data, terminating the phase center offset in-band variation compensation operation.

Example 1-12: An apparatus comprising means for performing a method of any of Examples 1-1 to 1-11.

Example 1-13: A computer program product including a non-transitory computer-readable storage medium and storing executable code that, when executed by at least one data processing apparatus, is configured to cause the at least one data processing apparatus to perform a method of any of Examples 1-1 to 1-11.

Figure 9:
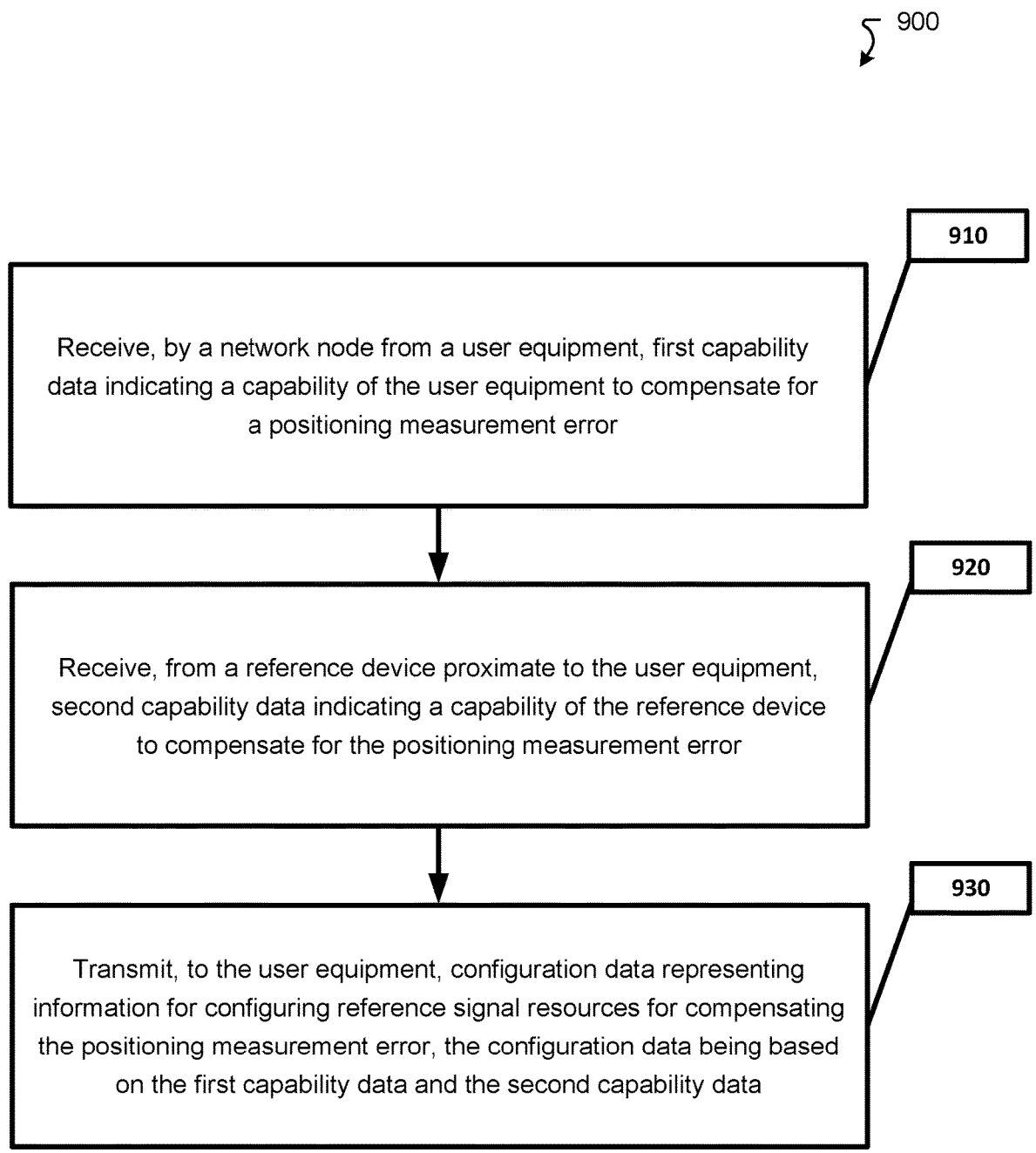
FIG. 9 is a flow chart illustrating compensation of positioning measurement error via a proximate reference device according to an example implementation.

Example 2-1: FIG. 9 is a flow chart illustrating a method of estimating time synchronization according to an example implementation. At 910, the method includes receiving, by a network node from a user equipment, first capability data indicating a capability of the user equipment to compensate for a positioning measurement error. At 920, the method includes receiving, from a reference device proximate to the user equipment, second capability data indicating a capability of the reference device to compensate for the positioning measurement error. At 930, the method includes transmitting, to the user equipment, configuration data representing information for configuring reference signal resources for compensating the positioning measurement error, the configuration data being based on the first capability data and the second capability data.

Example 2-2: According to an example implementation of Example 2-1, wherein the capability data indicates a capability of compensating for the positioning measurement error over a wide band of frequencies, and wherein the reference signal resources are resources for a wideband reference signal, the wideband reference signal resources being configured for compensating the positioning measurement error over the wide band of frequencies.

Example 2-3: According to an example implementation of Example 2-2, wherein the positioning measurement error over the wide band of frequencies includes a phase center offset in-band variation.

Example 2-4: According to an example implementation of Example 2-3, wherein the method further comprises transmitting, to the reference device, first instruction data representing instructions to transmit a broad beam reference signal to the user equipment; transmitting, to the user equipment, second instruction data representing instructions to listen for the broad beam reference signal; and receiving, from the user equipment, reporting data representing (i) an indication that conditions for a compensation of the positioning measurement error are acceptable and (ii) a number of beam configurations for which a respective positioning measurement error is to be compensated.

Example 2-5: According to an example implementation of any of Examples 2-3 or 2-4, wherein the method further comprises transmitting, to the user equipment, first instruction data representing instructions to transmit a wideband reference signal to the reference device; and transmitting, to the reference device, second instruction data representing instructions to listen for the wideband reference signal and, after receiving the wideband reference signal, perform a measurement operation on the wideband reference signal to produce compensation parameter values, and transmit the compensation parameter values to the network node.

Example 2-6: According to an example implementation of Example 2-5, wherein the method further comprises receiving compensation parameter data from the reference device, the compensation parameter data representing the compensation parameter values; and transmitting the compensation parameter data to the user equipment.

Example 2-7: According to an example implementation of any of Examples 2-3 to 2-6, wherein the method further comprises receiving, from the user equipment, termination data indicating that the phase center offset in-band variation has been compensated.

Example 2-8: According to an example implementation of any of Examples 2-3 to 2-7, wherein the compensation of the positioning measurement error over the wide band of frequencies is triggered according to a temporal schedule.

Example 2-9: According to an example implementation of Example 2-8, wherein the temporal schedule indicates that the compensation of the positioning measurement error over the wide band of frequencies is triggered periodically.

List of example abbreviations:

| | |
|---|---|
| AoA | Angle of Arrival |
| DL PRS | Downlink Positioning Reference Signal |
| gNB | 5G Base Station |
| IoT | Internet of Things |
| LCS | Location Service |
| LMF | Location Management Function |
| LPP | LTE Positioning Protocol |
| NR | New Radio (5G) |
| NRPPa | New Radio Positioning Protocol A |
| RS | Reference Signal |
| RSRP | Reference Signal Received Power |
| RTT | Round Trip Time |
| SRS | Sounding Reference Signal |
| SRS-P | SRS for positioning |
| UE | User Equipment |
| UL | Uplink |
| PCO | Phase Center Offset |
| UEO | UE Origin |

Figure 10:
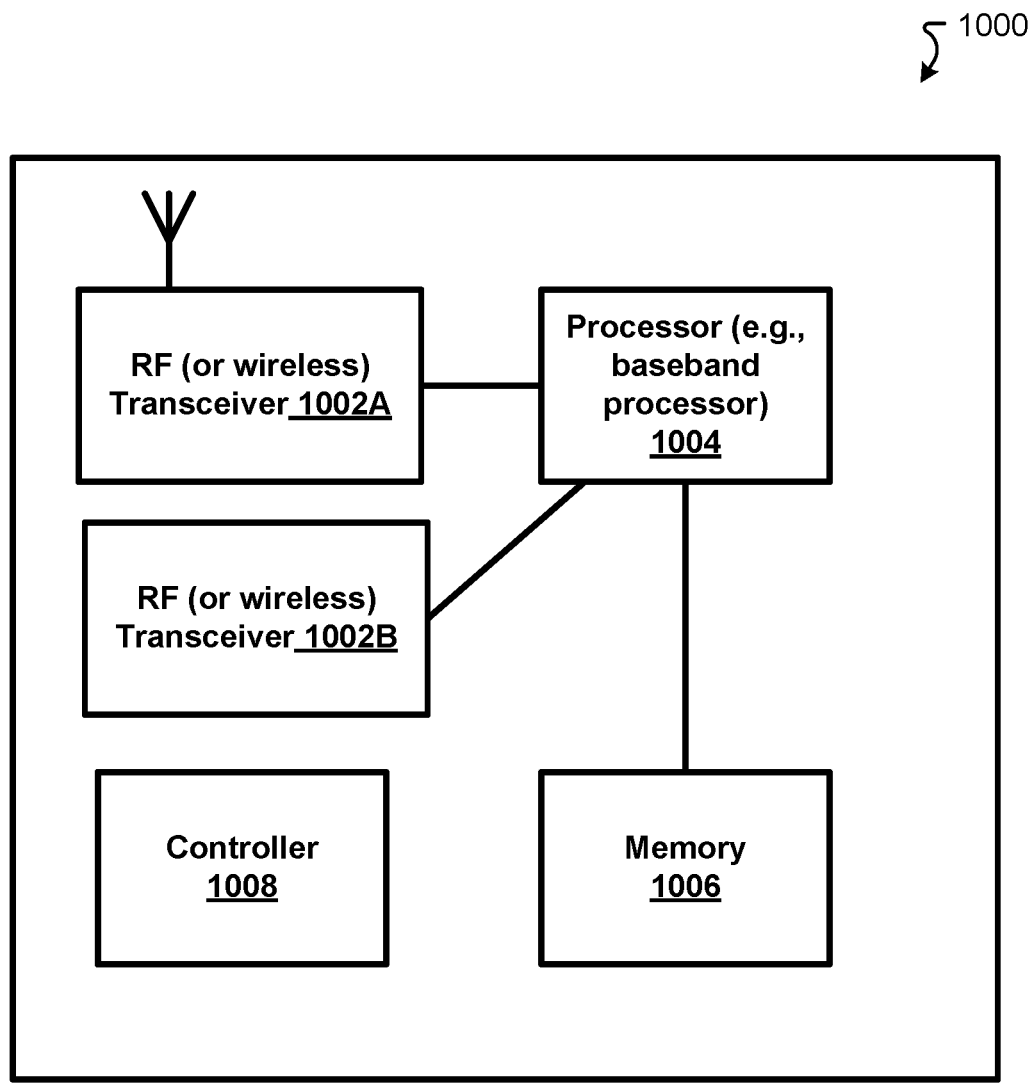
FIG. 10 is a block diagram of a node or wireless station (e.g., base station/access point, relay node, or mobile station/user device) according to an example implementation.

FIG. 10 is a block diagram of a wireless station (e.g., AP, BS, e/gNB, NB-IoT UE, UE or user device) 1000 according to an example implementation. The wireless station 1000 may include, for example, one or multiple RF (radio frequency) or wireless transceivers 1002A, 1002B, where each wireless transceiver includes a transmitter to transmit signals (or data) and a receiver to receive signals (or data). The wireless station also includes a processor or control unit/entity (controller) 1004 to execute instructions or software and control transmission and receptions of signals, and a memory 1006 to store data and/or instructions.

Processor 1004 may also make decisions or determinations, generate slots, subframes, packets or messages for transmission, decode received slots, subframes, packets or messages for further processing, and other tasks or functions described herein. Processor 1004, which may be a baseband processor, for example, may generate messages, packets, frames or other signals for transmission via wireless transceiver 1002 (1002A or 1002B). Processor 1004 may control transmission of signals or messages over a wireless network, and may control the reception of signals or messages, etc., via a wireless network (e.g., after being down-converted by wireless transceiver 1002, for example). Processor 1004 may be programmable and capable of executing software or other instructions stored in memory or on other computer media to perform the various tasks and functions described above, such as one or more of the tasks or methods described above. Processor 1004 may be (or may include), for example, hardware, programmable logic, a programmable processor that executes software or firmware, and/or any combination of these. Using other terminology, processor 1004 and transceiver 1002 together may be considered as a wireless transmitter/receiver system, for example.

In addition, referring to FIG. 10, a controller (or processor) 1008 may execute software and instructions, and may provide overall control for the station 1000, and may provide control for other systems not shown in FIG. 10 such as controlling input/output devices (e.g., display, keypad), and/or may execute software for one or more applications that may be provided on wireless station 1000, such as, for example, an email program, audio/video applications, a word processor, a Voice over IP application, or other application or software.

In addition, a storage medium may be provided that includes stored instructions, which when executed by a controller or processor may result in the processor 1004, or other controller or processor, performing one or more of the functions or tasks described above.

According to another example implementation, RF or wireless transceiver(s) 1002A/1002B may receive signals or data and/or transmit or send signals or data. Processor 1004 (and possibly transceivers 1002A/1002B) may control the RF or wireless transceiver 1002A or 1002B to receive, send, broadcast or transmit signals or data.

The embodiments are not, however, restricted to the system that is given as an example, but a person skilled in the art may apply the solution to other communication systems. Another example of a suitable communications system is the 5G concept. It is assumed that network architecture in 5G will be quite similar to that of the LTE-advanced. 5G uses multiple input—multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Implementations may also be provided on a computer readable medium or computer readable storage medium, which may be a non-transitory medium. Implementations of the various techniques may also include implementations provided via transitory signals or media, and/or programs and/or software implementations that are downloadable via the Internet or other network(s), either wired networks and/or wireless networks. In addition, implementations may be provided via machine type communications (MTC), and also via an Internet of Things (IOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, implementations of the various techniques described herein may use a cyber-physical system (CPS) (a system of collaborating computational elements controlling physical entities). CPS may enable the implementation and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various implementations of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, implementations may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. An apparatus, comprising:
   at least one processor; and
   at least one memory including computer program code;
   the at least one memory and the computer program code configured to cause the apparatus at least to:
   transmit, by a user equipment to a network node, capability data indicating a capability of compensating for a positioning measurement error;
   receive, from the network node, configuration data representing information for configuring reference signal resources for compensating the positioning measurement error;
   transmit, to a reference device proximate to the user equipment, a reference signal using the configured signal resources; and
   receive, from the reference device after transmitting the reference signal, compensation data representing values of compensation parameters for compensating the positioning measurement error.

2. The apparatus as in claim 1, wherein the capability data indicates a capability of compensating for the positioning measurement error over a wide band of frequencies,
   wherein the reference signal is a wideband reference signal, and
   wherein the reference signal resources are resources for the wideband reference signal, the wideband reference signal resources being configured for compensating the positioning measurement error over the wide band of frequencies.

3. The apparatus as in claim 2, wherein the compensation data is received by the user equipment via the network node.

4. The apparatus as in claim 3, wherein the at least one memory and the computer program code are further configured to cause the apparatus at least to:
   receive, from the reference device, a broad beam reference signal;
   perform a measurement on the broad beam reference signal to produce a measurement result; and
   transmit reporting data to the network node, the reporting data being based on the measurement result, the reporting data representing at least one of (i) an indication that conditions for a compensation of the positioning measurement error are acceptable and (ii) a number of beam configurations for which a respective positioning measurement error is to be compensated.

5. The apparatus as in claim 4, wherein the positioning measurement error over the wide band of frequencies includes a phase center offset in-band variation.

6. The apparatus as in claim 5, wherein the at least one memory and the computer program code configured to cause the apparatus at least to perform the measurement on the broadband reference signal is further configured to cause the apparatus at least to:
   determine that (i) an antenna configuration of the user equipment and (ii) a relative location between the user equipment and the reference device corresponds to an uncompensated phase center offset in-band variation error; and
   determine that a reference signal quality metric from the broadband reference signal is greater than a threshold.

7. The apparatus as in claim 5, wherein the at least one memory and the computer program code are further configured to cause the apparatus at least to:
   after receiving the compensation data, storing an indication that a relative location between the user equipment and the reference device corresponds to a compensated phase center offset in-band variation error.

8. The apparatus as in claim 2, wherein the at least one memory and the computer program code are further configured to cause the apparatus at least to:
   after receiving the compensation data, transmit termination data to the network node, the termination data indicating that the positioning measurement error has been compensated.

9. The apparatus as in claim 2, wherein the user equipment and the reference device are connected via a side-link connection, and
   wherein the at least one memory and the computer program code are further configured to cause the apparatus at least to:
   prior to transmitting the wideband reference signal to the reference device, transmitting, to the reference device, initiation data representing an indication that a positioning measurement error compensation operation is being initiated.

10. The apparatus as in claim 9, wherein the compensation data is received via the side-link connection.

11. The apparatus as in claim 2, wherein the at least one memory and the computer program code are further configured to cause the apparatus at least to:
    after receiving the compensation data, terminating the positioning measurement error compensation operation.

12. A method, comprising:
    transmitting, by a user equipment to a network node, capability data indicating a capability of compensating for a positioning measurement error;
    receiving, from the network node, configuration data representing information for configuring reference signal resources for compensating the positioning measurement error;
    transmitting, to a reference device proximate to the user equipment, a reference signal using the configured signal resources; and
    receiving, from the reference device after transmitting the reference signal, compensation data representing values of compensation parameters for compensating the positioning measurement error.

13. An apparatus, comprising:
at least one processor; and
at least one memory including computer program code;
the at least one memory and the computer program code configured to cause the apparatus at least to:
receive, by a network node from a user equipment, first capability data indicating a capability of the user equipment to compensate for a positioning measurement error;
receive, from a reference device proximate to the user equipment, second capability data indicating a capability of the reference device to compensate for the positioning measurement error; and
transmit, to the user equipment, configuration data representing information for configuring reference signal resources for compensating the positioning measurement error, the configuration data being based on the first capability data and the second capability data.

14. The apparatus as in claim 13, wherein the capability data indicates a capability of compensating for the positioning measurement error over a wide band of frequencies,
wherein the reference signal is a wideband reference signal, and
wherein the reference signal resources are resources for the wideband reference signal, the wideband reference signal resources being configured for compensating the positioning measurement error over the wide band of frequencies.

15. The apparatus as in claim 14, wherein the at least one memory and the computer program code are further configured to cause the apparatus at least to:
transmit, to the reference device, first instruction data representing instructions to transmit a broad beam reference signal to the user equipment;
transmit, to the user equipment, second instruction data representing instructions to listen for the broad beam reference signal; and
receive, from the user equipment, reporting data representing (i) an indication that conditions for a compensation of the positioning measurement error are acceptable and (ii) a number of beam configurations for which a respective positioning measurement error is to be compensated.

16. The apparatus as in claim 14, wherein the at least one memory and the computer program code are further configured to cause the apparatus at least to:
transmit, to the user equipment, first instruction data representing instructions to transmit a wideband reference signal to the reference device; and
transmit, to the reference device, second instruction data representing instructions to listen for the wideband reference signal and, after receiving the wideband reference signal, perform a measurement operation on the wideband reference signal to produce compensation parameter values, and transmit the compensation parameter values to the network node.

17. The apparatus as in claim 16, wherein the at least one memory and the computer program code are further configured to cause the apparatus at least to:
receive compensation parameter data from the reference device, the compensation parameter data representing the compensation parameter values; and
transmit the compensation parameter data to the user equipment.

18. The apparatus as in claim 14, wherein the positioning measurement error over the wide band of frequencies includes a phase center offset in-band variation.

19. The apparatus as in claim 18, wherein the at least one memory and the computer program code are further configured to cause the apparatus at least to:
receive, from the user equipment, termination data indicating that the phase center offset in-band variation has been compensated.

20. The apparatus as in claim 14, wherein the compensation of the positioning measurement error over the wide band of frequencies is triggered according to a temporal schedule.

21. The apparatus as in claim 20, wherein the temporal schedule indicates that the compensation of the positioning measurement error over the wide band of frequencies is triggered periodically.

22. A method, comprising:
receiving, by a network node from a user equipment, first capability data indicating a capability of the user equipment to compensate for a positioning measurement error;
receiving, from a reference device proximate to the user equipment, second capability data indicating a capability of the reference device to compensate for the positioning measurement error; and
transmitting, to the user equipment, configuration data representing information for configuring reference signal resources for compensating the positioning measurement error, the configuration data being based on the first capability data and the second capability data.

23. A computer program product including a non-transitory computer-readable storage medium and storing executable code that, when executed by at least one data processing apparatus, is configured to cause the at least one data processing apparatus to perform a method of claim 12.

24. An apparatus comprising means for performing a method according to claim 1.

* * * * *